POSITION-2

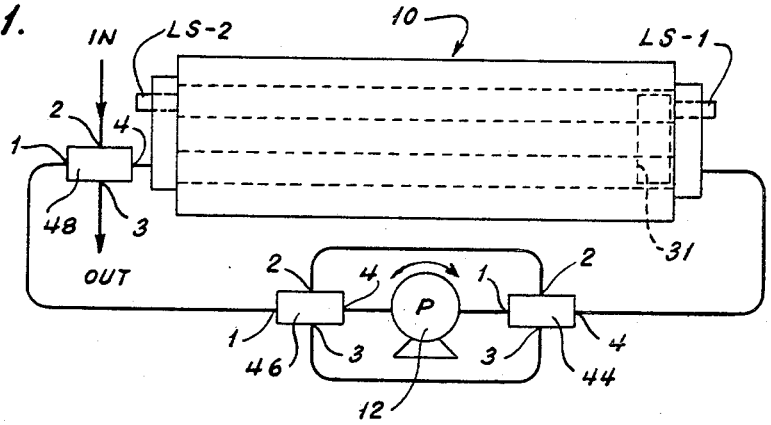
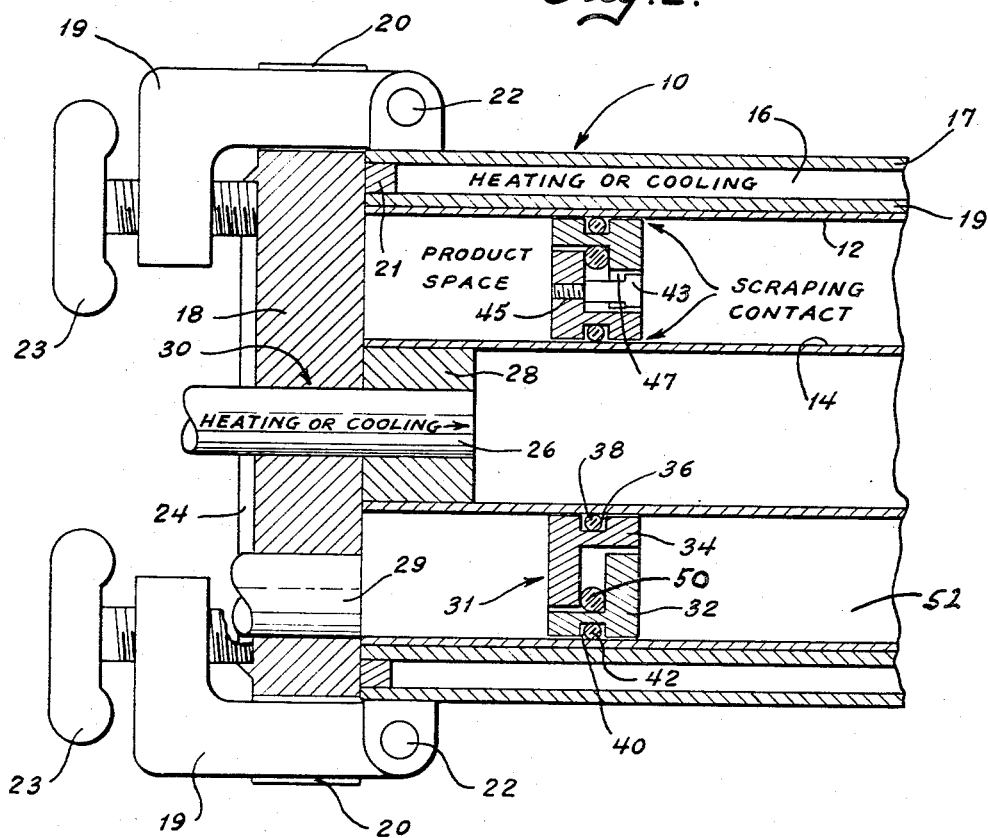

POSITION-1

INVENTOR.
John M. Leach

United States Patent Office 3,406,741
Patented Oct. 22, 1968

3,406,741
PROCESS AND APPARATUS FOR
TREATING LIQUIDS
John M. Leach, P.O. Box 341,
Port Jefferson, N.Y. 11777
Filed Nov. 14, 1966, Ser. No. 594,060
9 Claims. (Cl. 165—1)

ABSTRACT OF THE DISCLOSURE

The present invention relates to an apparatus and process for treating liquids wherein a liquid is passed over a surface and a piston-like scraper is moved over the same surface at the same time by the movement of the liquid to remove all deposits from the surface. A pump, valves and piping are provided so that the same increment of liquid can be passed back and forth over the surface as many times as desired during a given treatment period so as to greatly increase the amount of scraping action available per treatment period.

---

The present invention relates to process and apparatus for treating liquids. More particularly, it relates to process and apparatus for treating liquids in which the liquid to be treated is alternately passed across a given surface while using the force of the moving liquid to operate a scraper for the surface and, when desired, exchanging heat with said liquid through said surface.

In the treating of liquids, particularly while heating or cooling the liquids, it has frequently been the practice to pass the liquid over the interior wall of a closed cylindrically shaped chamber, either heating or cooling the opposite side of the wall, and scraping the wall by means of blades carried by a central shaft passing out of the ends of the chamber through bearings and packing glands and driven by an external motor. This operation has been beset with frequent stoppages due to blade breakage, bearing contamination and packing failure. Also, the treating time has been controled by the rate of flow of the liquid through the chamber which can never be made dependably constant because the flow rate will vary with any variation in the consistency of the liquid.

It is an object of the present invention to provide a process and apparatus for treating liquids in which the liquid is constantly passed over a surface during the entire treating operation and the surface is constantly scraped by a scraper motivated by the force of the moving liquid.

It is a further object of the present invention to provide a process and apparatus for treating liquids as aforesaid and in which the treating period is accurately controlled as to time and the liquid movement and scraping operation are co-extensive with the treating time.

It is another object of the present invention to provide an apparatus for treating liquids which includes two co-axial cylindrical surfaces between which the liquid is passed back and forth along the axis of the cylindrical surfaces during the treating period.

Other objects and advantages will become apparent to those skilled in the art upon recourse to the following specification read in connection with the accompanying drawings in which:

FIG. 1 is a diagrammatic view of an apparatus including a treating chamber capable of being used to carry out the process of the present invention;

FIG. 2 is a fragmentary cross sectional view of the treating chamber of the present invention;

Figure 3:
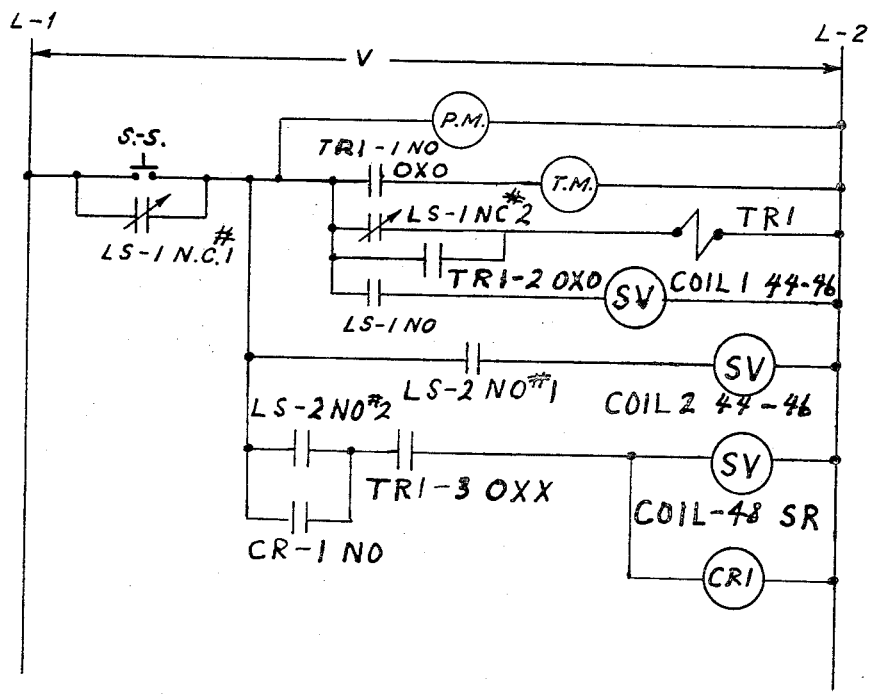
FIG. 3 is a diagram of a circuit for controlling the apparatus of the present invention.

The treating unit 10 of the present invention comprises a cylinder having an interior liquid contacting surface 12 and a concentric inner cylinder having an exterior liquid contacting surface 14. A heating or cooling jacket for the surface 12 is provided by concentric cylinders 17 and 19 closed at each end by a spacer ring 21 and supplied with heating or cooling fluid by any desired piping not shown. A heating or cooling of the surface 14 is provided by directing heating or cooling fluid into the inner cylinder by means of an inlet pipe 26 removably inserted through a collar 28 which is preferably compressible in nature. An outlet pipe (not shown) is preferably provided at the opposite end of the inner cylinder.

The treating unit 10 is provided with removable closure headers 18, of which only one is shown, each of which is held in liquid-tight position on the unit 10 by two or more clamp fingers each of which is pivoted as at 22 on suitable lugs and extends into suitable spaces 20 in the periphery of the headers 18. Each of the clamp fingers 19 is provided with a clamping screw 23 which contacts a header 18 just on the inside of a confining shoulder 24 on each header 18.

An inlet-outlet pipe 29 for the liquid extends through each header 18 preferably at the position shown in FIG. 2.

A piston-scraper 31 is formed of two parts shaped as shown at 32 and 34 in FIG. 2. The outer part 32 is provided with a groove 40 in which an O ring 42 is seated and the inner part is provided with a groove 36 in which an O ring 38 is seated. The parts 32 and 34 are loosely connected together by shoulder bolts each of which is threaded into part 34 as shown at 45 and is provided with a head 43 seated in a counterbored slot 47 in the part 32. An O ring 50 is lightly clamped between the two parts to prevent leakage of liquid through the space filled by the O ring but not tight enough to prevent relative movement between the two parts as the piston-scraper moves along the two surfaces 12 and 14 caused by even very slight misalignment of the two cylindrical surfaces. It can be seen that the two O rings 38 and 42 will wipe or scrape the two surfaces 12 and 14 as it moves along and thus prevent any formation of any deposit from the liquid onto these surfaces.

In carrying out the process of the present invention, a treating cycle is always initiated and terminated with the piston-scraper 31 in the position shown in FIG. 1 in which 31 is at the right hand extremity of its movement. At the initiation of a treating cycle liquid to be treated is passed through a pipe 29 into the chamber 52 formed between the surfaces 12 and 14 and the force caused by the movement of the incoming liquid moves the piston-scraper to the left until it contacts the header 18 at that end at which point the introduction of liquid is stopped. The liquid to the right of piston-scraper 31 is then suitably pumped into the chamber 52 on the left side of piston-scraper 31 which moves 31 to the right until it contacts header 18 on the right at which time the liquid on the left of 31 is then pumped into chamber 52 on the right which moves 31 to the left until it contacts header 18 on the left and this alternate pumping of the liquid from one end of the chamber 52 to the other end and the concurrent moving of the piston-scraper 31 from one end of chamber 52 to the other end which keeps all deposit wiped from the treating surfaces 12 and 14, continues until the end of the predetermoned treating cycle at which time 31 will be at the extreme right hand end of the chamber 52. At that point fresh liquid to be treated is pumped into the right hand end of the chamber 52 which contacts the right side of piston-scraper 31 and moves it to the left. This forces the treated liquid on the left side of 31 to be forced out of the pipe 29 on the left hand end of chamber 52 into a suitable receiver for the treated liquid and the cycle proceeds as before.

Some treating operations require only a mixing or mingling of liquid components, in which case the heating or cooling jackets will remain empty. When the liquid being treated is required to be heated or cooled during the treating cycle, a suitable heating or cooling fluid will be supplied to the two jackets in well known manner.

The aforementioned treating cycle can be carried out automatically by numerous pump, piping and valve arrangements and what is now considered the preferred arrangement is shown in FIG. 1 which includes three solenoid actuated hydraulic valves 44, 46 and 48 and a single pump 12, all interconnected and connected to the treating unit 10 by piping as shown diagrammatically in FIG. 1. A now preferred electrical control circuit is shown in FIG. 3.

The pump 12 is preferably driven continuously during operation of the system by means of any desired well known type of variable speed prime mover not shown, in the direction of the arrow.

The three solenoid valves are identical except that 44 and 46 are two coil, two position valves and 48 is a single coil, spring return, two position valve. Position 1 of each of the valves is diagrammatically illustrated in FIG. 5 and position 2 in FIG. 4.

A limit switch actuator LS-1 is positioned as shown in FIG. 1 so as to be contacted by the piston-scraper 31 when it is at the right hand extremity of chamber 52, and a second limit switch actuator LS-2 is positioned so as to be contacted by 31 when it is at the left hand extremity of chamber 52.

Figure 4:
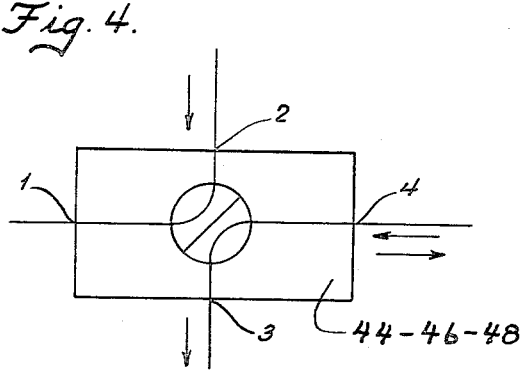
FIG. 4 is a diagrammatic view of an electrically actuated hydraulic valve capable of use in the apparatus of the present invention and shown in one operative position.
Figure 5:
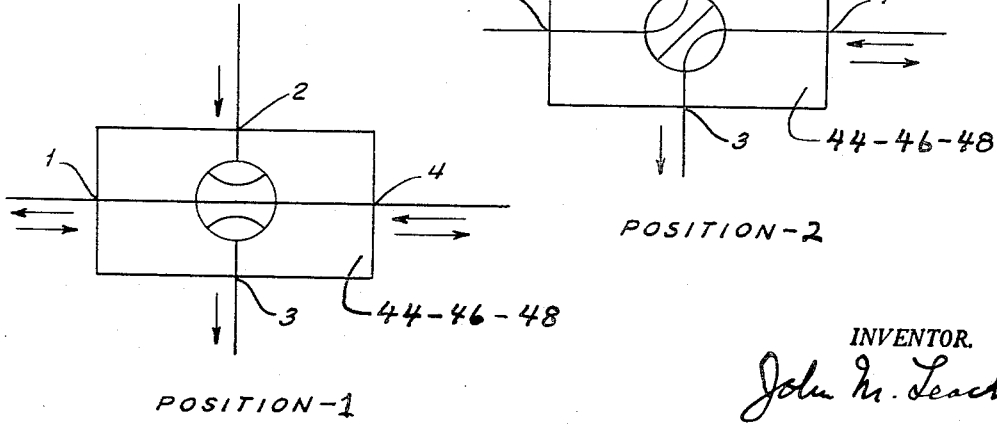
FIG. 5 is a diagrammatic view of the valve of FIG. 4 shown in another operative position.

An electrically controlled, automatic operation of the apparatus and process of the present invention is as follows: The start-stop switch SS is closed which completes a circuit from line L-1 through the motor PM for pump 12 to line L-2 which starts the pump 12 running. It will be noted that the piston-scraper 31 is now contacting actuator LS-1 so that all of the normally closed limit switch contacts actuated by LS-1 are open and the normally open contacts are closed. This causes a circuit to be completed from line L-1, through SS, through LS-1 NO, through solenoid valve coil 1 of valves 44 and 46 to L-2 which energizes the valves 44 and 46 and they assume position 1 of FIG. 5. Solenoid valve 48 is not energized at this time so that it is in position 2 as shown in FIG. 4. This causes untreated liquid to flow from any desired source through the "IN" pipe shown in FIG. 1 into port 2 of valve 48 and out of port 1 and through the pipe to valve 46 where it enters port 1 and leaves port 4, then flows through the pipe to pump 12 and then through the pipe to valve 44 where it enters port 1 and leaves port 4, and then flows through the pipe to the right hand end of chamber 52. The entering liquid starts the piston-scraper 31 moving to the left and it immediately breaks contact with LS-1 which closes all of the normally closed (NC) limit switch contacts actuated by LS-1 and opens the normally (NO) contacts.

This has the effect of breaking the circuit to coil 1 of solenoid valves SV 44 and 46 but these valves do not change position because coil 2 has not been energized. When LS-1 NC#2 closed the clutch coil of electromechanical timer TR1 was energized which closed the timer relay contacts TR1 NO which started the timer motor TM which started the timing period for which the timer had been initially set. A preferred timer for this application is readily commercially available and has relay contacts which can be set so as to the either open or closed in each of three operational states of the timer motor, namely, reset timing, and timed-out. For example TR1–NO is marked OXO which means that it is open during reset, closed during timing and open during timed-out.

Piston-scraper 31 continues to move until it contacts LS-2 at the left hand extremity of its travel. This closes contacts LS-2 NO#1 which energizes coil 2 of solenoid valves SV 44 and 46 which move these valves to position 2. This also closes LS-2 NO#2 which completes a circuit through TR1-3 OXX which is closed at that time because the motor is timing. This energizes solenoid valve SV 48 which moves it to position 1, and at the same time relay CR1 is energized which closes contacts CR-1 NO and establishes a holding circuit around LS-2 NO#2.

With the solenoid valves so positioned the pump 12 draws liquid from the right hand end of camber 52, passes it into port 4 and out of part 3 of valve 44; passes it into port 3 and out of port 4 of valve 46 and into pump 12 from where it passes into port 1 and out of port 2 of valve 44 and then into port 2 and out of port 1 of valve 46; and then into port 1 and out of port 4 of valve 48 and into the left hand end of chamber 52 which causes the piston-scrape 31 to move to the right until it contacts LS-1. This does not de-energize coil of TR1 at this time because TR1-2 OXO is closed at this time because the motor is timing. It does close LS-1 NO which again energizes coil 1 of valves 44 and 46 and they move back to position 1. This causes pump 12 to take liquid from the left hand end of chamber 52 and into port 4 and out of port 1 of valve 48; then into port 1 and out of port 4 of valve 46 to the pump 12; then into port 1 and out of port 4 of valve 44 and then into the right hand end of chamber 52, which moves piston-scraper 31 to the left.

This alternate rapid pumping of the liquid from one end of chamber 52 to the other with concurrent scraping movement of the piston-scraper 31 and treatment of the liquid as previously described will continue until the timing period for which the timer is set expires and thereafter until piston-scraper 31 again reaches the position at the right-hand end of chamber 52. This is accomplished as follows: Assume that the piston-scraper 31 is moving to the left when the time period expires which causes the motor TM to stop or time out because the contacts TR1–1NO OXO open at that time. Contacts TR1–2 OXO also open at that time but TR1 coil is not deenergized because LS-1 NC#2 remains closed. TR1-3 OXX remains closed at that time. When the piston-scraper 31 contacts LS-2 the liquid flow is reversed as above explained and the piston-scraper moves to the right until it contacts LS-1 which opens LS-1 NC#2 which deenergizes coil TR1 which resets the timer. This also closes LS-1 NO which causes solenoid valves 44 and 46 to move to position 1 and also opens TR1-3 OXX which deenergizes relay CR1 and the coil of solenoid valve 48 which enables the return spring to move valve 48 to position 2. This permits untreated liquid to be pumped into port 2 and out of port 1 of valve 48; into port 1 and out of port 4 of valve 46; through pump 12; into port 1 and out of port 4 of valve 44 and into the right-hand end of chamber 52 which causes piston-scraper 31 to move to the right and force the fully treated fluid out of the left hand end chamber 52 into port 4 and out of port 3 of valve 48 to any desired dispositon and the treating cycle automatically repeats as long as start-stop switch S—S remains closed.

When it is desired to discontinue the treating operation the switch S—S is opened during a timed out condition so that when LS-1 NC#1 is opened at the end of the movement piston-scraper 31 to the right, all functions will cease. At the end of a treating operation, the treated liquid in the left hand end of chamber 52 will normally be removed by means of conventional hand operated vent and discharge valves not shown.

It will be noted that throughout all of the operations, fully treated liquid in the chamber 52 is never contacted by any untreated liquid.

Following a treating operation, any desired cleaning fluid can be passed through a selected treating period just as above explained instead of liquid to be treated in order to thoroughly cleanse the entire system.

The amount of scraping activity of the piston-scraper 31 can be varied by varying the speed of the motor for pump 12. Also, the scraping action can be increased as desired by using a high capacity pump which normally will not need to be high pressure because little pressure is required to pump from one end of chamber 52 to the other.

Among many treating operations which can be carried out by the process and apparatus of the present invention are heat curing, cold curing, polymerizing, acidifying, hydrolyzing, etc. The foregoing is to be considered as descriptive and not limitative because many changes can be made in the embodiment disclosed without departing from the spirit of the invention.

The invention having been described, what is claimed is:

1. A process of treating liquids comprising forcing a liquid to be treated through an opening into one end of a closed chamber having a piston-scraper therein coextensive with the cross sectional area of said chamber and movable in slidable scraping relation with the interior wall of said chamber, utilizing the force of the incoming liquid to bear against one side of said piston-scraper to move it to the end of said chamber remote from the liquid entrance and to scrape said wall thereof and treat said liquid, moving the entrained liquid out of said chamber and through an opening into the opposite end of said chamber from that where liquid was originally introduced so as to bear against the opposite side of said piston-scraper to move it to the end of the chamber through which liquid was originally introduced to again scrape said chamber wall and treat said liquid and thereby multiply the scraping action on said surface during a given treating period over what would be obtained if only one pass of the piston-scraper were to be made per treating period, and then withdrawing said treated liquid from said chamber.

2. A process of treating liquids as defined in claim 1 further characterized by exchanging heat with said liquid through the wall of said chamber.

3. A process of treating liquids as defined in claim 1 further characterized by repeatedly transferring liquid from one side of said piston-scraper to the other side for a selected treating time.

4. A process of treating liquid as defined in claim 3 further characterized by exchanging heat with said liquid through the wall of said chamber.

5. An apparatus for treating materials comprising two concentric inner and outer material contacting surfaces, a movable, ring-shaped, piston-scraper interposed between and substantially filling the area between said surfaces and being formed in separate parts, normally concentric scraper edges carried by said parts and in contact with said surfaces, and means connecting the said separate parts together so as to permit relative ececntric movement between said scraper edges during movement of said piston-scraper to accommodate for any misalignment between said surfaces and thus avoid any jamming of said piston-scraper between said surfaces.

6. A material treating apparatus comprising a unit providing an inner chamber having a material contacting surface, a piston-scraper in said chamber, co-extensive with the cross sectional area thereof and movable from one end of said chamber to the other end, a material inlet pipe, a material outlet pipe, a piping circuit connected between the inlet pipe, outlet pipe and the opposite ends of said chamber, a power driven pump connected in said piping circuit for moving material to be treated, valve means in said piping circuit for controlling the inlet of said material, outlet of said material and recirculation of said material into and out of opposite ends of said inner chamber, and other valve means for controlling the direction of material flow out of said pump whereby a given quantity of material to be treated can be pumped from the inlet pipe into one end of said chamber to thereby move said piston-scraper to the opposite end of said chamber while scraping said material contacting surface, and then pumped from the said one end of said chamber into the opposite end of said chamber to thereby move said piston-scraper in an opposite direction and to said one end of said chamber while scraping said material contacting surface, repeat the chamber end to end transfer of said given quantity of material as many times as desired, and finally discharge the treated material through said outlet pipe.

7. A material treating apparatus as defined in claim 6 and also having means to exchange heat with said liquid during the treating operation.

8. A material treating apparatus as defined in claim 7 further characterized in that the heat is exchanged through said material contacting surface.

9. A material treating apparatus as defined in claim 8 in which the material contacting surface is formed in two concentric parts.

References Cited

UNITED STATES PATENTS

| | | | |
|---|---|---|---|
| 2,901,225 | 8/1959 | Abrams | 165—94 |
| 2,995,451 | 8/1961 | Leach | 165—94 X |
| 2,995,450 | 8/1961 | Leach | 165—94 X |

ROBERT A. O'LEARY, *Primary Examiner.*

A. W. DAVIS, *Assistant Examiner.*